Feb. 1, 1966  J. A. BARNES  3,232,334
PRESSURE EXCHANGER PLANT
Filed April 23, 1964  3 Sheets-Sheet 1

Feb. 1, 1966   J. A. BARNES   3,232,334
PRESSURE EXCHANGER PLANT
Filed April 23, 1964   3 Sheets-Sheet 2

Feb. 1, 1966  J. A. BARNES  3,232,334
PRESSURE EXCHANGER PLANT
Filed April 23, 1964  3 Sheets-Sheet 3

15 United States Patent Office 3,232,334
Patented Feb. 1, 1966

3,232,334
PRESSURE EXCHANGER PLANT
John Anthony Barnes, Wokingham, England, assignor to Power Jets (Research & Development) Limited, London, England, a British company
Filed Apr. 23, 1964, Ser. No. 362,025
Claims priority, application Great Britain, May 10, 1963, 18,619/63
7 Claims. (Cl. 165—7)

This invention relates to pressure exchanger plant for producing an output of fluid reduced in temperature as compared with the temperature of any input fluid to the plant and is a continuation-in-part of my patent application Serial No. 75,752, filed on December 14, 1960.

In mines a source of air at high pressure is customarily available for operating mine machinery and a low pressure air source is customarily available for the ventilating system. The low pressure ventilating air in deep mines under tropical conditions, may have a temperature of the order of 55° C. It would be advantageous to utilise these readily available sources of air by converting them into a supply of cool air suitable for cooling the working faces of the mine. Such air for cooling purposes must be at substantially the same pressure level as the air available from the ventilating system and is required to be at a temperature of say 20° C.

The invention may, of course, be utilised in other circumstances wherever there is a convenient source of low and higher pressure fluid.

A pressure exchanger as hereinafter referred to is defined as a machine comprising cells in which one fluid quantity expands in such a manner as to compress another fluid quantity with which it is in direct contact, ducting to lead fluid streams at different pressures substantially steadily to and from the cells and means to effect cyclic relative motion between the cells and the ducting.

A pressure equalizer as hereinafter referred to is defined as apparatus which receives fluid at a low pressure and at a higher pressure and discharges fluid at a pressure intermediate the low and higher pressures.

Accordingly, the invention provides plant, including a pressure equalizer having low and higher pressure fluid inlet ports and an outlet port for fluid at a pressure intermediate the inlet pressures, a pressure exchanger having low pressure scavenging stage inlet and outlet ports, high pressure scavenging stage inlet and outlet ports and ducting connecting the inlet and outlet ports of the high pressure scavenging stage via a heat-exchanger, the outlet port of the pressure equalizer communicating with the high pressure scavenging stage and the low pressure scavenging stage outlet port being capable of supplying fluid at a temperature lower than that of any of the fluids supplied to the plant.

Preferably the outlet port of the pressure equalizer communicates with the high pressure scavenging stage downstream of the heat-exchanger.

The pressure equalizer may be in the form of an injector, the exit ends of the injector nozzles communicating with the outlet port for the fluid at the intermediate pressure. Preferably, an inner nozzle of the injector is connected to the higher pressure fluid inlet port and an outer nozzle of the injector is connected to the low pressure fluid inlet port.

Alternatively, the pressure equalizer may be in the form of a pressure exchanger.

Some embodiments of the invention will now be described by way of example, reference being made to the accompanying diagrammatic drawings in which.

Figure 1:
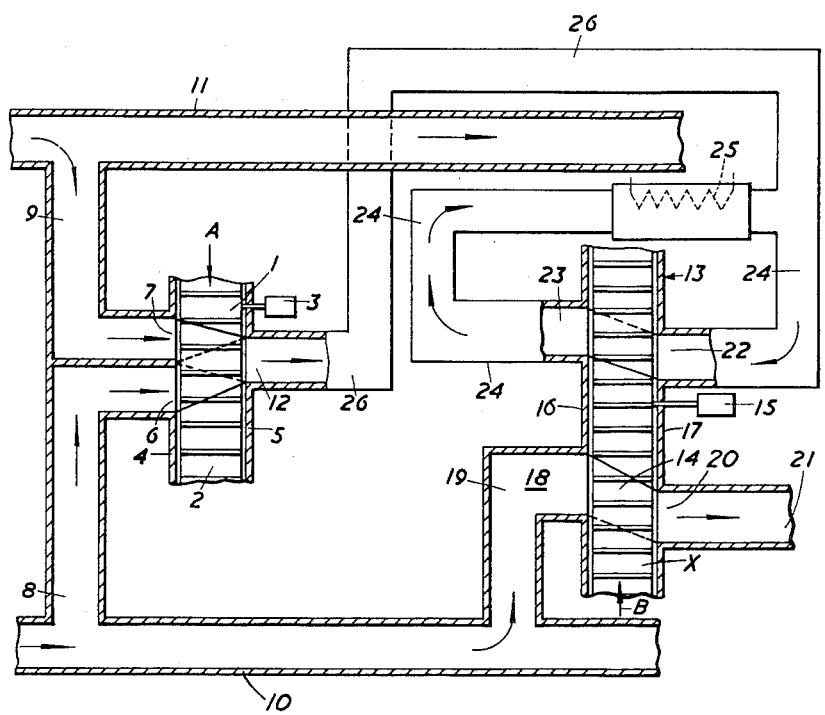
FIGURE 1 shows mine air cooling plant incorporating two pressure exchangers one of which is a pressure equalizer.

With reference to FIGURE 1, the pressure equalizer is shown in a developed view and takes the form of a pressure exchanger. The pressure equalizer includes a rotor 1 comprising a ring of cells 2. The rotor 1 is coupled to an electric motor 3 for rotation in a direction indicated by the arrow A relative to end-plates 4 and 5 which are adjacent the ends of the cells 2. Inlet ports 6 and 7 are located adjacent one another in the end-plate 4. The inlet ports 6 and 7 are respectively connected via ducts 8 and 9 to a ventilating air duct 10 and a compressed air line 11. The inlet ports 6 and 7 are respectively the low and high pressure fluid inlet ports. An outlet port 12 is located in the end-plate 5 of the pressure equalizer and is the outlet port for fluid at a pressure intermediate the inlet pressures of the two fluids introduced through the inlet ports 6 and 7.

A second pressure exchanger shown in a developed view at 13 has a rotor consisting of a ring of cells 14. The ring of cells 14 is arranged to be rotated in a direction shown by an arrow B by an electric motor 15; the rotation being relative to end-plates 16 and 17 which are adjacent the ends of the cells 14. An inlet port 18 located in the end-plate 16 is connected to the ventilating air duct 10 by a duct 19. An outlet port 20 is located in the end-plate 17 and forms one end of an outlet duct 21. The inlet and outlet ports 18 and 20 form a low pressure scavenging stage for the pressure exchanger 13. Inlet and outlet ports 22 and 23 respectively located in the end-plates 17 and 16 and are interconnected by a duct 24. The duct 24 and ports 22 and 23 form a high pressure scavenging stage of the pressure exchanger 13 and also a hot pass for a heat-exchanger 25.

The intermediate pressure outlet port 12 of the pressure equalizer is connected by a duct 26 to the duct 24 downstream of the heat-exchanger 25.

The operation of the pressure exchanger mine air cooling plant will now be described. The cells 2 of the pressure equalizer are rotated relative to the end-plates 4 and 5 in the direction indicated by the arrow A. The cells are charged with relatively high pressure air from the air line 11 via the duct 9 and high pressure inlet port 7 and also charged with low pressure air from the ventilating duct 10 via the duct 8 and the low pressure inlet port 6. The relatively low pressure air from the ventilating duct 10 is at a pressure for example of a little above atmospheric pressure and the relatively high pressure from the air line 11 is for example at a pressure of seven atmospheres. The relatively high and relatively low pressure air are at ambient temperatures. Air at an intermediate pressure say, at one and a half atmospheres and at ambient temperatures, is discharged through the outlet port 12. The mass flow of air bled from the air line 11 is supplemented by the mass flow of air bled from the ventilating air duct 10 and thus the additional load on the air line 11 imposed by the pressure exchanger plant will not be heavy.

The intermediate pressure air is passed via the duct 26 to combine, in the portion of the duct 24 downstream of the heat-exchanger 25, with the air leaving the pressure exchanger 13 through the outlet port 23 which air has been cooled in the heat exchanger from about 130° C. to about ambient temperature.

The operation of the second pressure exchanger 13 will now be described by considering one revolution of one of the cells 14 relative to the end-plates 16 and 17 starting from the position X and proceeding in a direction indicated by the arrow B. It can be assumed that a cell 14 in the position X contains air which was admitted to that cell at the high pressure scavenging stage 22, 23 and 24. The leading edge of a cell 14 having regard to the direction indicated by the arrow B passes the opening edge of the outlet port 20 in the end-plate 17. The contents of the cell 14 at this stage are at a pressure higher than the pressure of air in the outlet duct 21 to which the outlet port 20 is connected. Consequently, an expansion wave as shown in broken line is produced and the pressure of the air in the cell 14 is reduced as the cell 14 comes into full communication with the outlet port 20. The leading edge of the cell 14 has now passed the opening edge of the inlet port 18. The low pressure air supplied by the duct 19 to the inlet port 18 is at a higher pressure than the expanding air in the cells 14. Thus, a compression wave is produced as shown in full line and the air contained in the cell 14 is displaced through the outlet duct 21 via the outlet port 20 by the low pressure air entering the cell 14 from the ventilating duct 10 via the duct 19 and inlet port 18. This stage is known as the low pressure scavenging stage.

The leading edge of the cell 14 now passes the opening edge of the inlet port 22 in the end-plate 17. The pressure of the air contained in the cell 14 is less than the pressure of the combined air flow at the inlet port 22. Consequently, a compression wave as shown in full line is produced and the contents of the cell are compressed and thereby raised in temperature. As the cell 14 comes into full communication with the outlet port 23 the leading edge of the cell 14 passes the closing edge of the inlet port 22. The air in the cell 14 is at a higher pressure than the air pressure at the outlet port 23 and this pressure difference produces an expansion wave commencing from the closing edge of the inlet port 22 as shown in broken line. The air in the cell 14 is displaced from the cell 14 through the outlet port 23 and into the duct 24 by the air entering the cell 14 via the inlet port 22. This stage is known as the high pressure scavenging stage. The air leaving the outlet port 23 at a temperature say of 130° C. passes via the duct 24 to the hot pass of the heat-exchanger 25 which reduces the temperature of the air to a temperature of the order of the ambient temperature of the intermediate pressure air in the duct 26. The air downstream of the heat-exchanger 25 is joined by the air passing through the duct 26 and the combined air flow passes into the cell 14 via the inlet port 22. The expansion of the combined air flow into the cell 14 via the inlet port 22 produces cooling. The cell 14 now contains cooled air and due to the rotation of the cell 14 relative to the end-plates 16 and 17 is returned to the position in communication with the outlet port 20 of the low pressure scavenging stage. The cooled air contained in the cells expands as has been described previously thereby further cooling the air which is discharged into the outlet duct 21 at a temperature say of 20° C. The cycle is repeated as the cells preceding the cell 14 pass the position marked X and come into communication with the outlet port 20.

Figure 2:
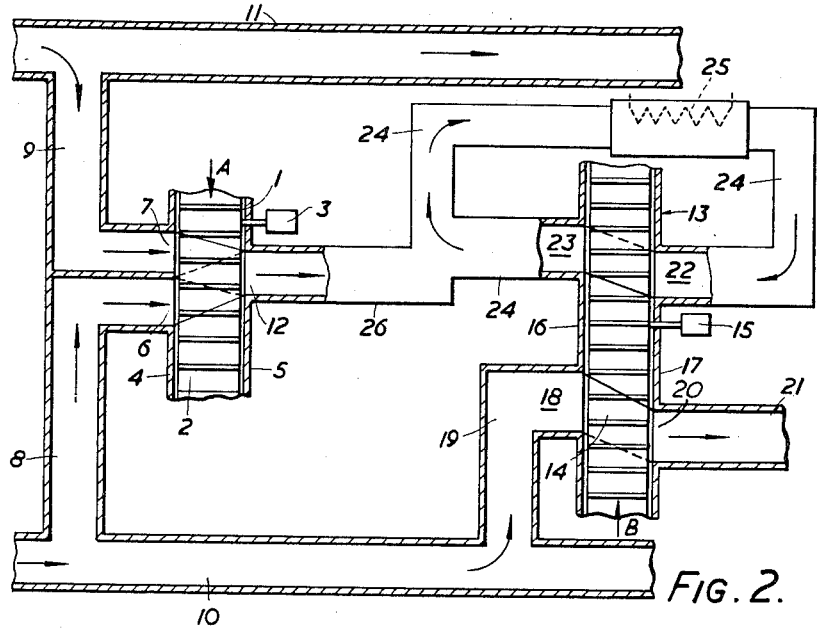
FIGURE 2 shows a modification of the mine air cooling plant shown in FIGURE 1.

FIGURE 2 shows mine cooling plant very similar to that shown and described with reference to FIGURE 1 and identical reference numerals are used. The duct 26 from the outlet port 12 of the pressure equalizer for the intermediate pressure air is connected to the duct 24 of the pressure exchanger 13 upstream of the heat-exchanger 25. Consequently, the air at a temperature of say 130° C. leaving the outlet port 23 is combined with the intermediate pressure air from the duct 26 upstream of the heat-exchanger 25. Apart from this difference, the operation of the mine cooling plant is the same as that described with reference to FIGURE 1 of the drawings.

Figure 3:
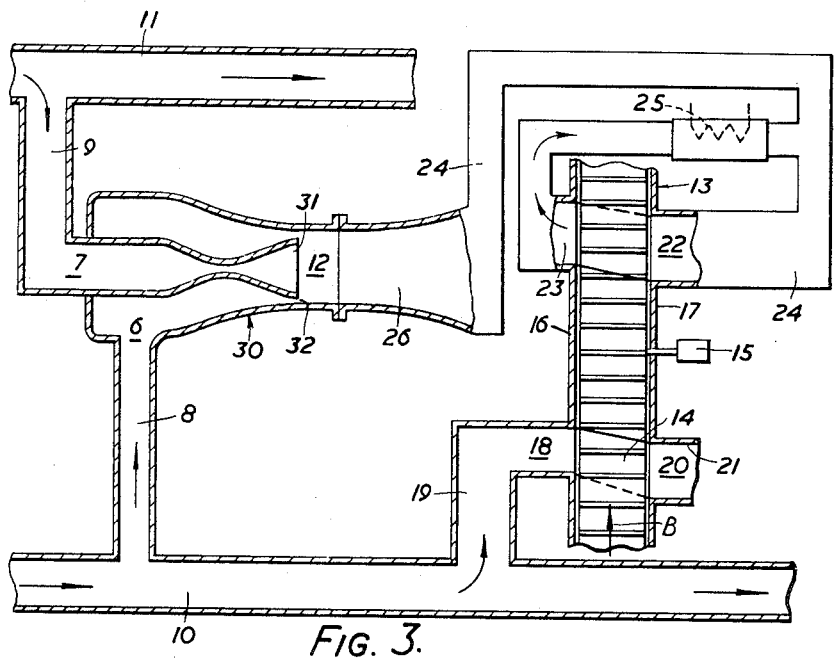
FIGURE 3 shows mine air cooling plant incorporating an injector and a pressure exchanger.

With reference to FIGURE 3, the pressure equalizer shown in FIGURE 1 as a pressure exchanger is replaced by an injector shown generally at 30. The injector 30 consists of an inner nozzle 31 which is in communication with the air line 11 via the duct 9 and the high pressure inlet port 7, and an outer nozzle 32 which surrounds the inner nozzle 31 and communicates with the ventilating duct 10 via the duct 8 and the low pressure inlet port 6. Both the inner and outer nozzles 31 and 32 discharge into a common outlet port 12 for fluid at a pressure intermediate the pressures in the high and low pressure inlet ports 7 and 6 respectively. The outlet port 12 is connected by ducting 26 to the duct 24. The remainder of the arrangement is identical to that described with reference to FIGURE 1 of the accompanying drawings.

The operation of the plant will now be described rather briefly since the operation is very similar to that shown and described with reference to FIGURE 1. The inner nozzle 31 receives via duct 9 and the high pressure inlet port 7 a supply of high pressure air from the air line 11. The outer nozzle 32 receives via the duct 8 and the low pressure inlet port 6 a supply of low pressure air from the ventilating duct 10. These streams of air combine downstream of the exits of the nozzles 31 and 32 and pass through the outlet port 12 as a stream of air having a pressure intermediate that of the low pressure air and high pressure air supplied via the ports 6 and 7 respectively. The remainder of the operation of the plant is the same as that described with reference to FIGURE 1.

Figure 4:
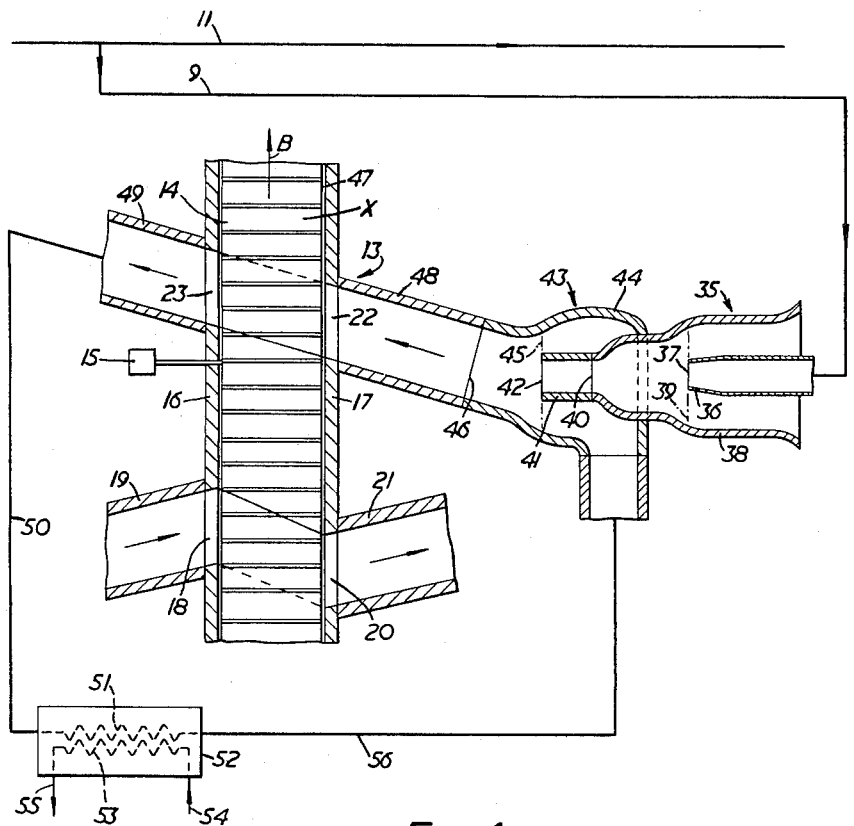
FIGURE 4 shows a modification of the mine air cooling plant shown in FIGURE 3.

Referring to FIGURE 4, the plant is arranged to receive input energy from a compressed air line 11 through a branch 9. A pressure equalizer in the form of an injector, indicated generally by the reference numeral 35, includes a compressed air nozzle 36 terminating at a higher-pressure inlet port 37 and connected to receive compressed air from the line 11 through the branch 9. An atmospheric air inlet duct 38 of the injector 35 surrounds and is concentric with the nozzle 36. A low-pressure annular inlet port 39 lies in the plane of the higher pressure inlet port 37 of the injector 35 and an intermediate pressure outlet port 40 lies downstream of both inlet ports.

The outlet port 40 of the injector 35 leads directly to a nozzle 41 which terminates at a higher-pressure inlet port 41 of a second pressure equalizer in the form of an injector denoted generally by the reference numeral 43. A generally annular section member 44 surrounds the nozzle 41 and in conjunction with the extremity of the nozzle 41 forms a low-pressure annular inlet port 45 of the injector 43. The intermediate-pressure outlet port 46 of the injector 43 leads, as will be further described hereinafter, to an inlet port of a pressure exchanger denoted generally by the reference numeral 13.

The pressure exchanger 13 has a cell ring 47 including a plurality of cells 14. The cell ring 47 is rotated by a motor 15, in the direction of the arrow B, between end-plates 16, 17 each of which has ports through which elastic fluid, in the present instance air, can pass to and from the cells. A low-pressure scavenging stage includes an inlet port 18 in the end-plate 16, an outlet port 20 in the end-plate 17 and cells at any time in communication with one or both of these ports. The inlet port 18 froms the termination of an inlet duct 19 and the outlet port 20 communicates with an outlet duct 21 which serves to convey the useful output of cool air to a region where it is required.

A high-pressure scavenging stage includes an inlet port 22 in the end-plate 17, an outlet port 23 in the end-plate 16 and cells at any time in communication with one or both of these ports. The inlet port 22 forms the termination of an inlet duct 48 and the outlet port 23 communicates with an outlet duct 49. From the drawing it will be seen that the inlet and outlet ports of the high-pressure scavenging stage are so disposed relatively to the cells that air entering and leaving the cells will have a component of motion in the direction of rotation of the cell ring.

The outlet duct 49 communicates with duct 50 which in turn communicates with the hot pass 51 of a contra-flow heat-exchanger 52. The cold pass 53 of the heat-exchanger 52 has an inlet 54 and an outlet 55. The outlet of the hot pass 51 communicates with duct 56 which leads to the high-pressure scavenging stage inlet duct 48 through the injector 43.

The operation of the plant will now be described. Compressed air from the air line 11 is admitted to the injector 35 through the compressed air nozzle 36 and on issuing from the higher-pressure inlet port 37 this compressed air entrains air from the ambient atmosphere through the air inlet duct 36 and low-pressure annular port 39 to form a stream of air in the nozzle 41 having a large mass flow, high velocity and a total pressure in excess of that in the high-pressure scavenging stage loop ducting 56 and hence also in the member 44. On issuing from the port 42 of the nozzle 41 the high velocity stream entrains air from the scanvenging loop ducting 56 through the port 45 and the final stream at a pressure slightly above the pressure at the outlet port 23 of the pressure exchanger enters the cell ring 47 of the pressure exchanger 13 through the inlet duct 48 and the inlet port 22. The pressure in the inlet port 22 is higher than that in the outlet port 23 because of inefficiency in the pressure exchnager process. Passage through the ducting 50, 56 and through the heat-exchanger 52 causes a pressure loss which is made up by the compressed air supplied through the injector 43.

The operation of the pressure exchanger itself is as described with reference to FIGURE 1.

I claim:
1. Plant including a pressure equalizer having low and high pressure fluid inlet ports and an outlet port for fluid at a pressure intermediate the inlet pressures, a heat exchanger, a pressure exchanger having low pressure scavenging stage inlet and outlet ports, high pressure scavenging stage inlet and outlet ports and ducting connecting the inlet and outlet ports of the high pressure scavenging stage via the heat-exchanger, the outlet port of the pressure equalizer communicating with the high pressure scavenging stage and the low pressure scavenging stage outlet port being capable of supplying fluid at a temperature lower than that of any of the fluids supplied to the plant.

2. Plant as claimed in claim 1 in which the outlet port of the pressure equalizer communicates with the high pressure scavenging stage downstream of the heat-exchanger.

3. Plant as claimed in claim 1, in which the pressure equalizer is in the form of an injector, the exit ends of the nozzles communicating with the outlet port for fluid at the intermediate pressure.

4. Plant as claimed in claim 3, in which an inner nozzle of the injector is connected to the higher pressure inlet port and an outer nozzle of the injector is connected to the low pressure fluid inlet port.

5. Plant as claimed in claim 1, in which the pressure equalizer is in the form of a pressure exchanger.

6. Plant as claimed in claim 1, in which the outlet port of the pressure equalizer is connected to the higher-pressure inlet port of a second pressure equalizer, the low pressure inlet port of which is in communication with the ducting leading from the high-pressure scavenging stage outlet port of the pressure exchanger.

7. Plant as claimed in claim 6, in which both pressure equalizers take the form of injectors.

References Cited by the Examiner

UNITED STATES PATENTS 3,076,422  2/1963  Spalding _____ 230—69 X

FOREIGN PATENTS 876,601  8/1942  France.
1,060,669  7/1959  Germany.

ROBERT A. O'LEARY, *Primary Examiner.*

CHARLES SUKALO, *Examiner.*